Dec. 30, 1930.  D. R. THOMAS  1,786,463
TRAILER CONSTRUCTION
Filed Sept. 7, 1929   2 Sheets-Sheet 1

Inventor
DAVID R. THOMAS
By
Attorney

Dec. 30, 1930.  D. R. THOMAS  1,786,463
TRAILER CONSTRUCTION
Filed Sept. 7, 1929  2 Sheets-Sheet 2

INVENTOR
DAVID R. THOMAS
BY
ATTORNEY

Patented Dec. 30, 1930

1,786,463

UNITED STATES PATENT OFFICE

DAVID R. THOMAS, OF CLEVELAND, OHIO

TRAILER CONSTRUCTION

Application filed September 7, 1929. Serial No. 390,952.

This invention relates to trailers and more particularly to that type of trailer which is adapted to be hauled over a highway and also carried on a railroad flat car.

Trailers have been built which may be hauled by motor truck or tractor to the railroad, uncoupled from the truck or tractor, loaded on a railroad flat car and transported to a desired point and then coupled up to another truck or tractor and hauled to their destination.

However, those trailers of which I am aware which are particularly adapted for highway use are not entirely suitable for flat car transportation and vice versa, those adapted to railroad use are not particularly efficient highway vehicles. It is among the objects of my invention to provide a trailer which is a satisfactory highway vehicle; to provide a trailer which may be easily and quickly coupled to and uncoupled from its hauling means; to provide a trailer which may be readily loaded on a railroad flat car and have an even flat surface contacting with the car; to provide a trailer which has no parts extending beyond the limits of the general contour of the trailer body so that a plurality of trailers may be loaded on a single railroad flat car with their ends closely abutting thereby conserving space and facilitating loading and carriage.

The above and other objects will appear from the following description of a preferred form of my invention, reference being had to the accompanying drawings in which:—

Figure 1:
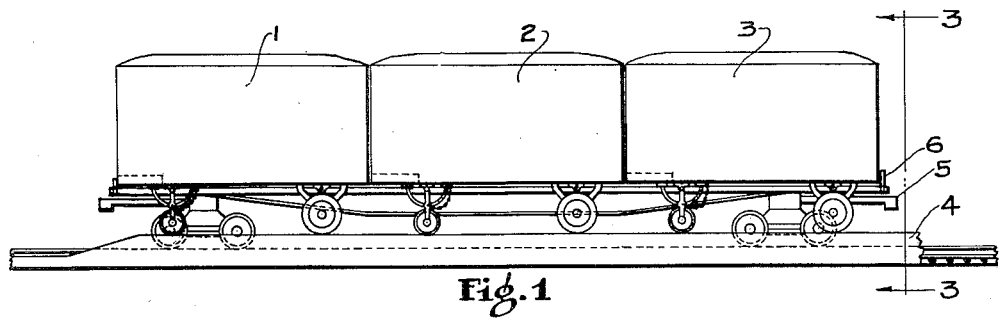
Figure 2:
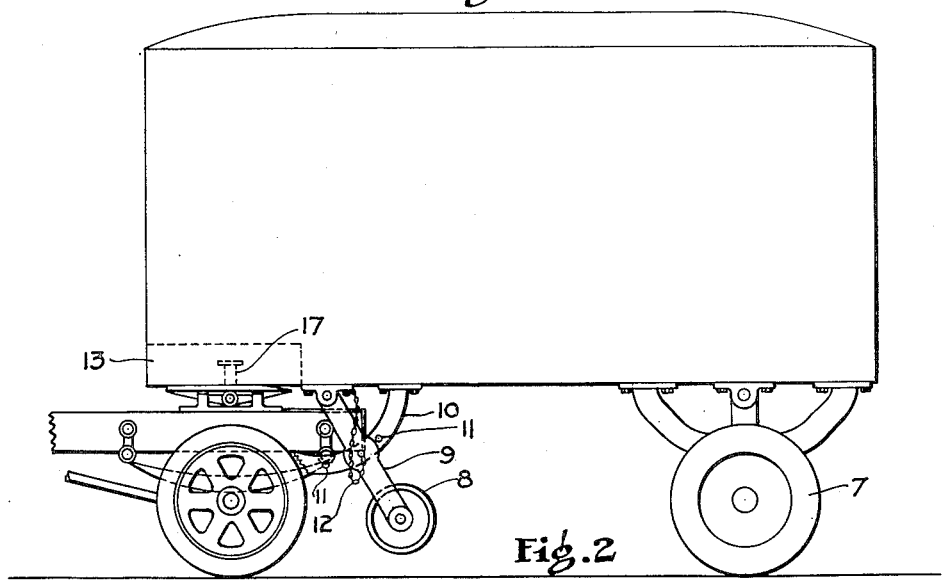
Figure 3:
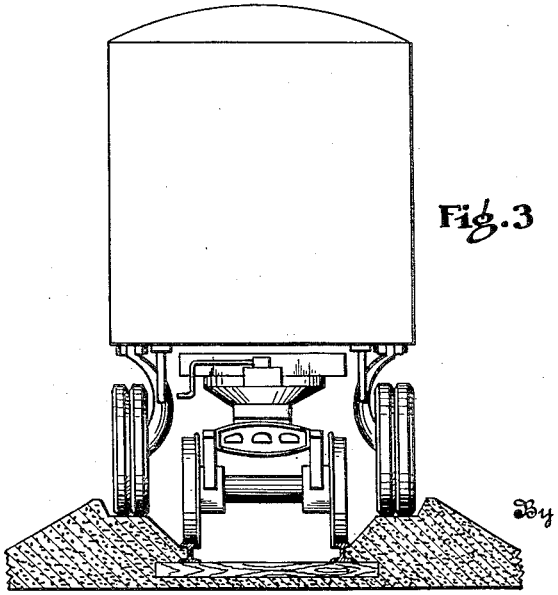
Figure 4:
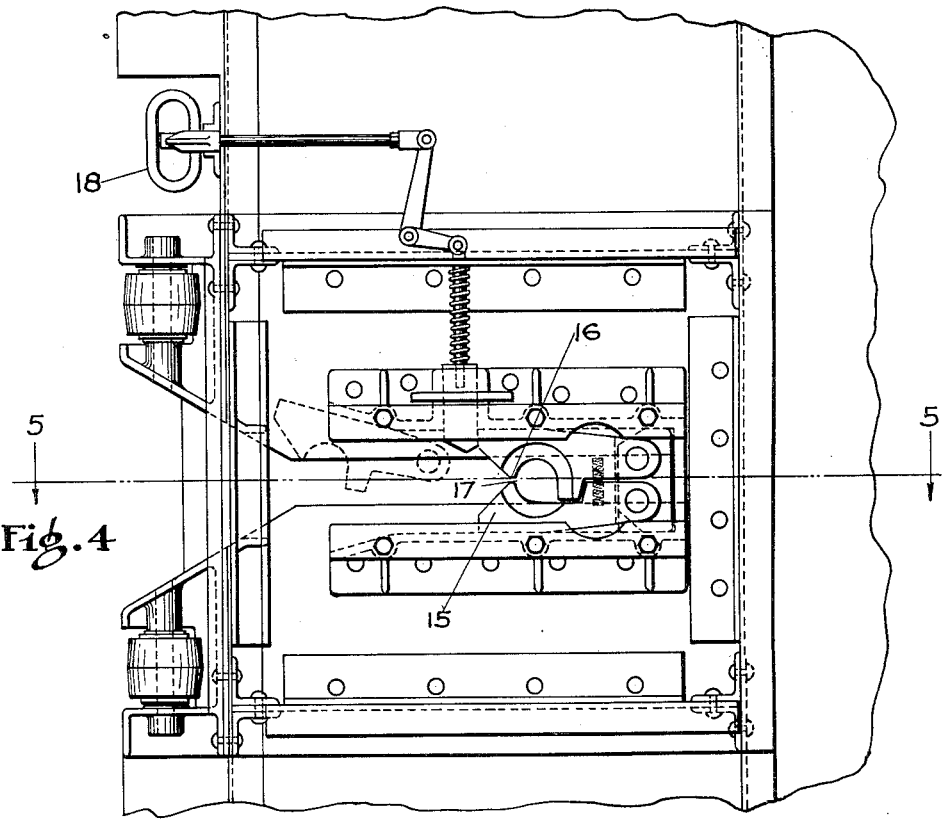
Figure 5:
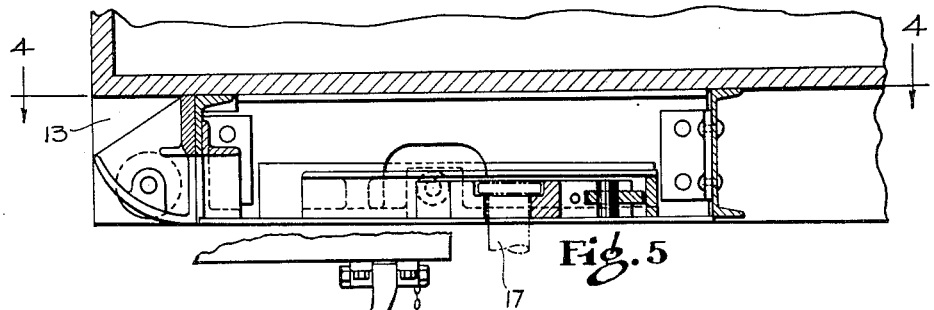
Figure 6:
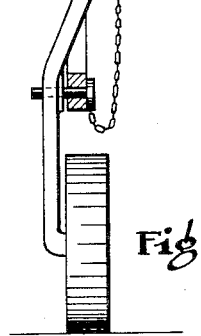

Figure 1 is a diagrammatic side elevation of three trailers in position to be carried on a railroad flat car; Figure 2 is a side elevation of a trailer coupled to a tractor or dolly; Figure 3 is an enlarged end view taken on line 3—3 of Figure 1; Figure 4 is a fragmentary plan view showing the coupling mechanism taken on line 4—4 of Figure 5; Figure 5 is a fragmentary vertical section taken on line 5—5 of Figure 4; and, Figure 6 is an end view of the trailer front wheel mounting.

In Figure 1, the trailers 1, 2 and 3 are shown standing on the loading ramp 4 with their ends abutting. A railroad flat car 5 is in position below the trailers but not supporting their weight. If flat car 5 be moved to the left the trailers will be rolled along on the ramp by the bar 6, or other suitable means and, as they come to the end of the ramp, will be lowered upon the flat car with their wheels projecting downwardly on opposite sides of the flat car and clearing the railway roadbed.

When the flat car arrives at its destination it is run between a pair of ramps similar to those used in loading. The trailers are lifted off the flat car by the ramps and may then be rolled off and coupled to a truck or tractor for hauling over a highway.

Figure 2 illustrates the type of trailer I prefer to employ. Each wheel is individually supported, the rear wheels 7 being preferably spring supported in the manner fully described and claimed in my co-pending United States patent application, Serial No. 371,195, filed June 15, 1929. The front wheels 8, see also Figure 6, are mounted on the end of depending arms 9 which are pivotally mounted on the trailer frame. A U-shaped bracket 10 is secured to the trailer frame at its open ends and is provided with holes 11. When the arm 9 is locked in the vertical position by passing a pin 12 through the lowest of holes 11 and the hole in the arm 9, the bottom of wheels 8 will be the same distance from the trailer body as the bottom of rear wheels 7 and the trailer may be rolled on and off the loading ramps or moved for short distances around a factory or warehouse. However when the trailer is coupled to a truck or tractor the small wheels 8 are swung up out of contact with the ground by removing pin 12, swinging arm 9 back on its pivot and locking it in raised position as seen in Figure 2 by means of pin 12. Figure 2 illustrates the trailer coupled to a truck or tractor with the small front wheels 8 lifted up out of contact with the ground.

As wheels 7 and 8 are all independently mounted there are no axles or other connections extending across between the wheels and the bottom of the trailer is flat and free from all projections. This permits it to rest firmly on a railroad flat car and greatly facilitates railroad transportation of the trailer.

The mechanism on the trailer for coupling it to a truck or tractor is set into the body of the trailer as best illustrated in Figures 4 and 5. The recess 13 which is provided in the bottom of the trailer is of such size that all of the coupling mechanism may be enclosed therein and none will extend out beyond the projections of the trailer walls and bottom. The entire coupling mechanism is disposed within the limits of the general contour of the trailer body. This construction makes it possible to load a plurality of trailers on a railroad flat car with their end walls abutting as shown in Figure 1 and their bottom surfaces firmly seated on the floor of the car. The full capacity of the flat car may be utilized when my trailers are employed as there will be no waste space due to the necessity of spacing the trailers apart on the flat car as is the case in other trailers with which I am familiar in which the coupling mechanism projects beyond the outline of the body. It will be understood that the overall length of my trailers should preferably be made such that when the desired number of trailers are on a car the entire available length of the car will be utilized. For example, if the trailers be made fifteen feet in overall length, three trailers will just fit on a forty-five foot standard railroad flat car.

I do not claim as part of my invention the particular coupling mechanism which is located in recess 13 of the trailer. The type shown is a common and practical form of automatic coupler having a pair of jaws 15 and 16 which are locked in position around a pin 17 mounted on the fifth wheel of the tractor or dolly. When it is desired to couple the tractor to a trailer it is only necessary to back the truck up to the trailer until the pin 17 slides into the open V at the front of the coupling mechanism and is then locked in place by the jaws 15 and 16. The front wheels 8 of the trailer hold the coupling mechanism at the proper height so that it will engage the pin 17 when the truck is backed up against it. The wheels 8 may be swung back out of the way when the coupling is complete.

To uncouple the trailer a hand operated release such as that operated by handle 18 may be provided. This is adapted when operated to release the jaws 15 and 16 and allow the pin 17 to be disengaged from the trailer coupling mechanism. Jaw 16 is shown in its open position in dotted lines in Figure 4.

Other forms of fifth wheel and coupling devices either automatic or hand operated may be utilized in connection with my trailer, all within the spirit of my invention and I do not wish to be limited to the specific type illustrated and described herein.

It will be clear from the above description and the drawings that my improved trailer is a most efficient means for transporting freight over highways and railroads without the usual delays and difficulties incident to such transportation where the freight must be transferred from truck to railroad car and from car to truck. No space is wasted on the railroad car and the trailer itself is a practical highway vehicle.

It will be clear to those skilled in the art that modifications may be made in the details of my invention without departing from the spirit thereof and therefore I do not wish to be limited in any manner other than by the claims appended hereto.

What I claim is:

1. A vehicle of the class described having coupling mechanism in which the entire coupling mechanism is disposed within the limits of the general contour of the vehicle body.

2. A vehicle of the class described having a body, individually supported wheels mounted on said body and coupling means disposed entirely within the limits of the general contour of said body.

3. A vehicle having a body, a pair of rear wheels, a pair of front wheels adapted to be moved out of their operating positions and means completely within the limits of the general contour of said body for coupling said vehicle to another vehicle.

4. A vehicle having a flat bottomed body, wheels mounted on said body so that the bottom of said body is unobstructed through its central longitudinal portion and coupling means disposed completely within the space bounded by the outer surfaces of said body or the projections thereof.

5. A vehicle having a substantially flat bottomed body, wheel supporting brackets secured to said body at the sides thereof, said body having a recess extending upwardly from the bottom surface and being open at one end, and coupling means disposed entirely within said recess.

6. In a vehicle of the class described the combination of a body, wheels, individual supports for said wheels depending from said body and supported to leave a space free from all obstructions between the bottom of said body and the road, said body having a recess at one end extending upwardly from the bottom thereof, and coupling means disposed entirely within said recess.

7. In a vehicle of the class described the combination of a body, wheels, means for independently supporting each of said wheels to leave a space free from obstructions extending the entire length of the vehicle and from the bottom of the body to the ground, and vehicle coupling means disposed entirely within the space bounded by the outer surfaces of said body or the projections thereof.

8. A dual purpose trailer having wheels for rolling support on the highways and having an unobstructed bottom surface to facilitate loading and carriage on railway flat cars over railways, said trailer having a fifth wheel coupling completely contained above the plane of its bottom surface for engagement with a tractor when drawn over roadways and free from contact with flat cars when the trailer is supported and carried thereon.

9. A dual purpose trailer having a body supported on the roadway by wheels mounted on relatively vertical supports whereby an unobstructed space is afforded between the bottom of the body and ground, said trailer having a fifth wheel coupling disposed in the bottom of the body and above the plane thereof and within the longitudinal contour thereof for engagement with a tractor, in combination with a railway flat car disposed between said wheels and supporting said body by engagement with the bottom surface thereof along a planar surface above which said fifth wheel coupling is disposed.

10. In combination, a railway flat car, a plurality of trailers having bodies having end walls abutting and having flat bottom surfaces evenly engaging and supported by said flat car, the combined length of said bodies equalling the length of said flat car, each of said trailers having road wheels depending alongside the flat car and out of contact with the railway road bed, and each of said trailers having a fifth wheel coupling adapted to engage a tractor and disposed within the exterior contours of said bodies and above the plane of engagement between the bodies and the flat car and within the plane of engagement between abutting end walls of said bodies.

In testimony whereof I hereunto affix my signature this 5th day of September, 1929.

DAVID R. THOMAS.